Figure 1:
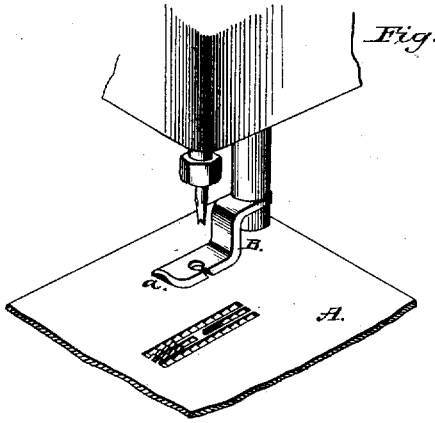

C. H. WILLCOX & C. CARLETON.

SEWING-MACHINE.

No. 7,214. Reissued July 4, 1876.

Attest:

Charles Seldon
Sanford C. Hosey

Inventors:

Chas H. Willcox
Cyrus Carleton
by their atty
Pollok & Bailey

N. PETERS, PHOTO-LITHOGRAPHER, WASHINGTON, D. C.

UNITED STATES PATENT OFFICE.

CHARLES H. WILLCOX, OF NEW YORK, AND CYRUS CARLETON, OF BROOKLYN, N. Y., ASSIGNORS TO WILLCOX & GIBBS SEWING MACHINE COMPANY, OF NEW YORK.

IMPROVEMENT IN SEWING-MACHINES.

Specification forming part of Letters Patent No. 116,522, dated June 27, 1871; reissue No. 7,214, dated July 4, 1876; application filed June 5, 1876.

*To all whom it may concern:*

Be it known that we, CHARLES H. WILLCOX, of the city, and county, and State of New York, and CYRUS CARLETON, of Brooklyn, in the county of Kings and State of New York, have invented certain new and useful Improvements in Sewing-Machines, of which the following is a specification:

This invention relates to four-motion feeds, so called; and consists in certain improvements in the construction of the feed-plate and the parts of the cloth-plate contiguous thereto, and with both of which the cloth is brought in contact under the pressure of the pad.

The object of our invention is to overcome several defects which have hitherto existed in all four-motion feeds, one of which is the impossibility of feeding over seams of any considerable thickness without assistance from the hands of the operator.

When the seam is drawn by the feed-surface in its forward movement against the inclined surface of the toe of the presser-foot, and the feed-surface then drops away from the seam below the top of the cloth-plate, the pressure of the inclined surface of the toe of the foot forces the seam and goods back again into the position they started from; meanwhile the stitch-forming mechanism continues to work until the thread is snarled up beneath the cloth.

Another defect arises from the bottom of the presser-foot not being sufficiently covered by the teeth of the feed-surface, so as to enable the feed to take hold and carry the goods regularly along, whatever the inequalities may be. This defect is shown very plainly when one fell crosses another, in which case a bunch or ridge of cloth is formed, extending only half-way across the width of the foot and feed surface.

When this bunch is forced underneath the bottom of the foot and feed surface, although the goods may entirely cover the bottom of the foot, the foot is elevated so much from the cloth-plate that, unless it is sufficiently covered by the teeth of the feed-surface, the goods will not be fed along, but will remain stationary, while the stitch-forming mechanism continues to work, and the thread is finally snarled up.

Another defect arises from inequalities or seams being forced, by the pressure of the foot, into the square or oblong hole, which, in ordinary machines, is found immediately back of the needle-hole (and sometimes in front of it) through which the feed-surface operates. In this case the seam is liable to rest, in a measure, on the teeth of the surface during the whole of its motion, in this way making very slow progress and short stitches, and imparting a tendency to the goods to gather up underneath the foot. In order that the seam may be fed regularly, it should not be permitted to drop below the level of the cloth-plate.

Our invention is intended to obviate these and other defects; and to this end it may, in general, be stated to consist, first, in forming a toothed or serrated surface in that part of the cloth-plate under the presser-foot which will engage with and prevent the cloth from receding from the curved or beveled end of the presser while the feed is releasing its hold and moving back preparatory to taking a fresh hold upon the goods; second, in dividing the feeding-surface of a four-motion feed so as to afford on each side and in the front and rear of the needle a feeding-surface, each isolated from the others by the cloth-plate, and in such proximity, one to another, that no seam or bundle of goods can be fed under the presser-foot into such a position that the teeth of some one of the feeding-surfaces will not take hold of it and feed it along regularly.

To enable those skilled in the art to understand and use our invention, we will now proceed to describe the manner in which the same is or may be carried into effect, by reference to the accompanying drawing, in which—

Figure 2:
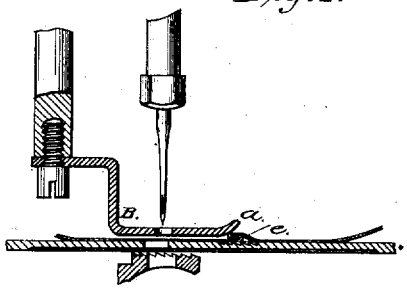
Figure 3:
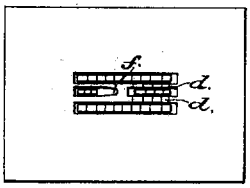
Figure 4:
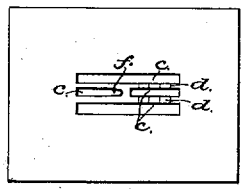
Figure 5:
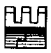
Figure 6:
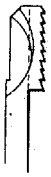
Figure 7:
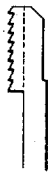
Figure 8:
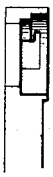
Figure 9:
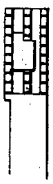

Figure 1 is a perspective view of the lower part of the presser-foot or pad, and a portion of the cloth-plate. Fig. 2 is a longitudinal vertical section through the foot, cloth-plate, and feed. Figs. 3 and 4 are top views of the cloth-plate, with and without the feeding-surfaces. Fig. 5 is a transverse vertical section of the feed. Figs. 6 and 7 are views of the feed taken from opposite sides. Fig. 8 is a bottom view of the feed. Fig. 9 is a top view of the same.

The portion of the cloth-plate in which the feed-surface opening or aperture is formed is represented at A. B is the presser-foot or pad, with its inclined or beveled toe *a*, constructed in the usual manner.

The feed-surface aperture consists of the four slots *c c c c*, the front portion of the center slot in rear of the needle serving also as a needle-hole, as indicated at *f*. By thus forming the feed-surface aperture, two strips or cross-bars, *d*, are left in the cloth-plate in front of the needle, which support the cloth and prevent any bunches or inequalities in it from being pressed below the cloth-plate, and resting on the feed-surface after the teeth have dropped below the level of the plate. On these two cross-bars, which lie under the presser-foot, are cut teeth like those on the feed-surface, which are embedded in the cloth by the pressure of the foot when the feed-surface drops below the cloth-plate, and thus prevent the seam from slipping backward away from the presser-foot when the feed releases its hold.

In Fig. 3 the feed surface or plate is represented in the slots *c*. This feed-surface is clearly shown in Figs. 5, 6, 7, 8, and 9. It consists of three parallel elongated surfaces, all parallel with the permanent line of feed, and the middle one divided as shown at *g*, so as to admit, when operating, of the passage of the needle between its two divisions. Each feed-surface is adapted to fill, or nearly fill, one of the slots *c*, the slots being of such dimensions as to allow the proper longitudinal movement of the surfaces, the center slot in rear of the needle being also elongated, so that its front part may form the needle-hole, as above explained.

It will be seen that the cross-bars *d d* of the cloth-plate support the cloth, and prevent it from resting on the feed-surface after the teeth have dropped below the level of the plate. The presser-pad is made a little narrower than the feed-surface, and the three lines of teeth of the feed are so near each other that no seam or bunch of goods can be fed under the pad into such a position that the teeth will not take hold of it and feed it regularly.

In Fig. 2 the seam *e* is represented as brought by the feed against the inclined toe of the foot B at *a*.

Heretofore, in four-motioned feeds, when the feed dropped away from the goods below the surface of the cloth-plate, the pressure of the inclined toe *a* tended to force the seam from under the foot; but, in the present instance, when the feed-surface drops away below the plate, the pressure of the toe of the pad tends to embed the seam or irregularity into the teeth of the cloth-plate, which teeth are purposely made quite rank. By this operation the seam is left where the feed-surface carried it, and the cloth is fed along regularly under the foot without assistance from the operator.

The advantages of such a feed are apparent. The stitches are of uniform length. The work is not marred by the needle passing down several times into the same hole, leaving a succession of loose loops hanging beneath the goods, and the thread is not broken and tangled on account of the feed not operating.

Having now described our invention, and the manner in which the same is or may be carried into effect, what we claim, and desire to secure by Letters Patent, is—

1. The combination, with a four-motion feed proper and a smooth presser foot or pad, of a cloth-plate having that part of its surface which lies under and in front of the presser-foot serrated, substantially as shown and described, so that the cloth may be prevented from receding from under the beveled end of the pad when the feed releases its hold thereon, as set forth.

2. A four-motion feed working in four separate elongated feed-slots arranged on four sides of the needle—namely, one in front, one in rear, and one on each side of the needle—but all parallel with the permanent line of feed, substantially as set forth.

3. A feeder composed of three parallel elongated feed-surfaces, the middle one of which is divided and arranged in relation to the cloth-supporting table and the needle-hole therein, substantially as described, so as to admit, when operating, of the passage of the needle between the two divisions, as shown and set forth.

CHAS. H. WILLCOX.
CYRUS CARLETON.

Witnesses for CHARLES H. WILLCOX:
A. POLLOK,
J. N. CAMPBELL.

Witnesses for CYRUS CARLETON:
CHARLES SELDEN,
SANFORD C. HOVEY.